(No Model.)　　　　　　　　　　　　　　　　2 Sheets—Sheet 1.
E. D. CARTER.
COTTON PLANTER.

No. 278,682.　　　　　　　　　Patented June 5, 1883.

WITNESSES
Jas. E. Hutchinson.
Geo. A. Seymour.

INVENTOR
E. D. Carter
By H. A. Seymour
Attorney (No Model.)  2 Sheets—Sheet 2.

E. D. CARTER.
COTTON PLANTER.

No. 278,682.  Patented June 5, 1883.

WITNESSES  
Jas. E. Hutchinson  
Geo. W. Seymour

INVENTOR  
E. D. Carter  
By H. A. Seymour  
Attorney

UNITED STATES PATENT OFFICE.

EDWARD D. CARTER, OF WEIMAR, TEXAS.

COTTON-PLANTER.

SPECIFICATION forming part of Letters Patent No. 278,682, dated June 5, 1883.

Application filed August 5, 1882. (No model.)

*To all whom it may concern:*

Be it known that I, E. D. CARTER, of Weimar, in the county of Colorado and State of Texas, have invented certain new and useful Improvements in Cotton-Planters; and I do hereby declare the following to be a full, clear, and exact description of the invention, such as will enable others skilled in the art to which it pertains to make and use the same.

My invention relates to an improvement in Cotton-Planters; and it consists in the parts and combinations of parts, as will be more fully described, and pointed out in the claims.

Figure 1:
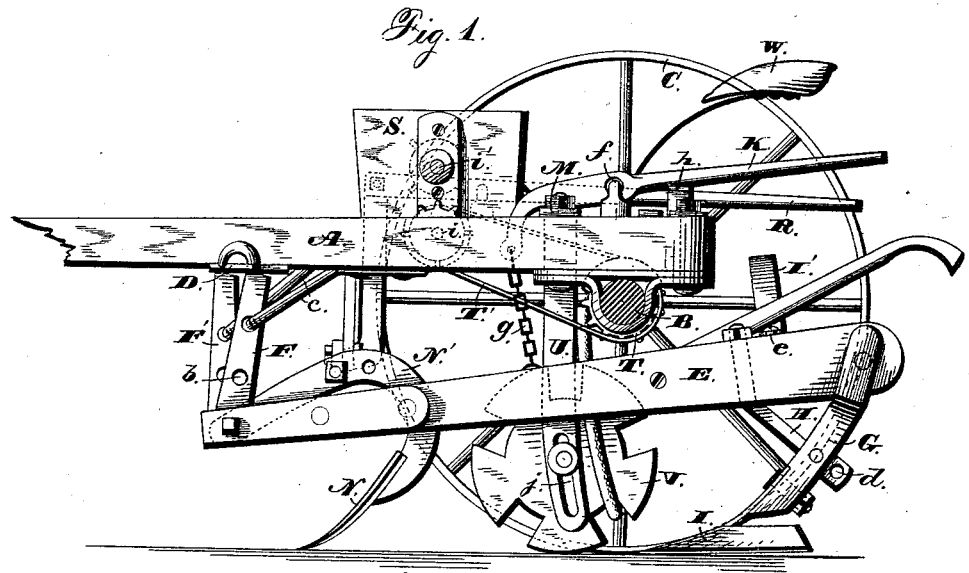
Figure 2:
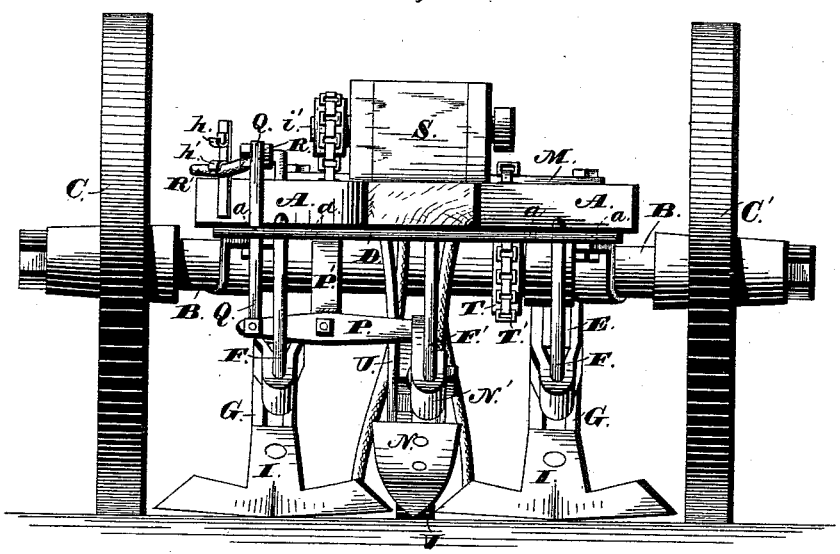
Figure 3:
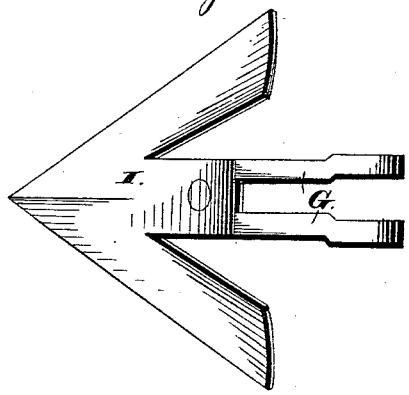
Figure 4:
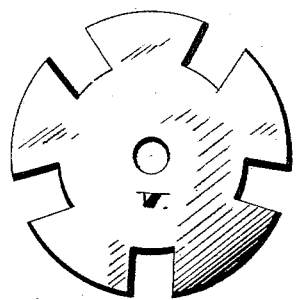

In the accompanying drawings, Figure 1 is a side view of my improved planter with all the operative parts in position. Fig. 2 is a front view of the same. Fig. 3 is a detached view of one of the cultivators, and Fig. 4 is a detached view of the marking-roller.

A represents the frame of the machine; B, the axle, and C C' the wheels, the wheel C being loosely journaled thereon and the wheel C' rigidly secured thereto, so as to cause the axle to revolve while the machine is moving forward, and also enable a short turn to be made with the machine. The entire weight of the frame, with its connected parts, rests on this axle, which latter is sufficiently elevated to enable the cultivator or sweeps which are secured to the frame and rest below the said axle to be elevated sufficiently to clear the ground. This frame is preferably made V-shaped and is provided near the front or narrow end with the horizontal bar D, to which the cultivator-beams E are pivotally secured by the depending hangers F. This bar is provided with a series of small holes, $a$, by means of which the hangers F can be adjusted nearer to each other or farther apart; and the lower end of each hanger is also provided with a series of holes, $b$, by means of which the front ends of the cultivator-beams E are vertically adjusted. Each hanger F is strengthened by the brace $c$, which latter connects it directly to the frame A. The cultivator-beams (two in number) extend rearwardly, and are each provided at its rear end, behind the axle B, with the standard G, which latter are pivotally secured at their upper ends to the beams E.

A brace, H, provided with a series of holes, $d$, at its lower end, connects each standard G to the plow-beam and securely holds it in position, and also enables the standards to be adjusted to any desired inclination to suit the existing circumstances.

A sweep or cultivator-tooth, I, is rigidly secured to the lower end of each standard, and are adapted to cultivate the ground for a suitable distance on each side of the furrow made by a shovel situated near the forward part of the machine, and also to cover up the cotton-seed after it has been dropped into the furrow. Each sweep is about twenty inches wide and is only adapted to penetrate the ground sufficiently for the purpose in view, which enables them to be easily managed.

The two beams E are connected together by the bridge I', which latter is provided near its ends with screw-holes $e$, by means of which the rear ends of the said beams are adjusted relative to each other.

K are levers pivoted at $f$ to the frame A, and provided at their front ends with means of attaching them to the beams E by the chains $g$. By pressing down the rear ends of these levers K the sweeps are elevated, and can be retained in this position as long as desired by means of the rigid stops $h$, under which the levers are moved. The limit of penetration of the sweeps is governed by the bar M, which latter passes transversely across the frame in front of the pivotal connections of the levers K and under the said levers, and limits the downward movement thereof, which control the depth of the plows by means of the connecting-chains.

Each beam is provided with a handle, by means of which they are controlled when used as a walking-planter.

N is the shovel-plow, which forms the furrow into which the seed is dropped. This plow is rigidly secured to the curved beam N', the front end of which is pivotally secured to the hanger F', which latter is removably secured to the horizontal bar D. This hanger F' is braced similar to the hangers F, already described.

The beam N is supported and held in position by the rocking lever P, which latter is secured thereto in any desired manner. This lever is pivotally secured near its center to the depending arm P', and the outer end thereof is pivotally secured to the lower end of the rod Q. This rod projects upwardly, and is connected at its upper end to the pivoted hand-lever R. This lever is also held in position by the stops h' h', which latter respectively hold the shovel N up above the surface of the ground and down in any operative position. By simply depressing the rear end of lever R the rod Q is elevated, which also elevates the outer end of the rocking lever P and depresses its inner end, and consequently lowers the shovel N.

S is the seed-box, situated on top of the frame, and provided in its lower face with an opening through which the seed is continuously fed by revolving feed-rollers situated inside of the box. The shaft i of the lower feed-roll projects beyond the box S at both ends, and is provided on such projecting ends with sprocket-wheels, one of which is connected to a similar sprocket-wheel secured on the upper shaft, i', by suitable chain-connection, while the sprocket-wheel on the opposite side is connected to the sprocket-wheel T on the axle B by the drive-chain T'. Any suitable feed-rollers can be employed which will feed a predetermined amount of seed in a given space while the machine is moving forward, and cut off the supply when the machine is at a standstill.

U are two depending arms secured to the frame A back of the shovel-plow N. Each arm U is provided near its lower end with an oblong slot, j, in which the journals of the marking-wheel V rest and move. This wheel is made of any suitable metal, or combined wood and metal, and is provided in its periphery, at suitable intervals, with the open slots or recesses k, the functions of which will be hereinafter described. The slots j in the arms U enable the heavy wheel V to rise and fall with the inequalities in the surface of the ground, and consequently exert an even pressure at all times.

W is the driver's seat.

Having described all the parts of the machine, I will now proceed to describe its operation.

The plow and sweeps are first lowered to operative positions and the machine is started forward. The plow N makes the furrow, and the rotary motion of the axle B turns the rollers in the seed-box and automatically drops the seed into the furrow thus formed. The heavy wheel is preferably removed during this operation, and the two sweeps following on behind cover the furrow and cultivate the land for about twenty inches on each side thereof. As the seed is planted in a continuous row, it is necessary to bunch or hill the young plants, and to accomplish this end I either remove the shovel-plow N or elevate it sufficiently above the young plants so as not to interfere therewith. The seed-box can also be removed, if desired; but as no seed is placed therein it is not absolutely necessary.

If the heavy wheel V has been removed, it should now be placed in position, and the machine is in readiness to "bunch" the plants. A position over a row of young plants is taken so that the large wheel V will run thereon. As the machine is moved forward this wheel revolves, and the plants entering the recesses in the said wheel are not disturbed, while those under the portions of the wheel between the recesses are mashed into the ground and covered up by the sweeps which follow in the wake of the wheel V.

The seed-box and wheel V can be removed from the machine, and a walking or riding cultivator is formed. The wheel V, being heavy, revolves by contact with the ground, and by being free to move vertically runs evenly regardless of the inequalities of the ground. The solid parts in the periphery of the wheel, being twelve, eighteen, or twenty inches in length, bury the cotton from one to one and a half inches below the surface of the ground, and the sweeps coming on behind cover the buried cotton up, leaving the cotton that entered the recesses standing at regular intervals in bunches twelve, eighteen, or twenty inches apart.

My improvement is simple in construction, is easy of operation, and can be manufactured at a comparatively small cost.

I am aware that a roller has been journaled in elongated slots to allow the roller to follow the uneven surfaces of the ground, and I am also aware that a cotton-planter has been provided with a wheel journaled in a frame, said wheel being provided with recesses and with cutters between the recesses for chopping off the cotton, and hence I would have it understood that I make no claim to such construction of parts.

Having fully described my invention, what I claim as new, and desire to secure by Letters Patent, is—

1. In a cotton-planter, the combination, with the supporting-frame, of a wheel journaled in vertically-elongated slots, said wheel being provided with separate segmental sections having smooth peripheries, and with recesses between said segments, substantially as set forth.

2. In a cotton-planter, the combination, with the horizontal bar D, hangers F, secured to said bar in a laterally-adjustable manner, and beams provided with sweeps pivoted to the lower ends of said hangers, of the lever K for raising and lowering the beams, substantially as set forth.

3. In a cotton-planter, the combination, with the horizontal bar D, hanger F, and beam N, pivoted at its forward end to the hanger, of the hanger P', horizontal rocking lever P, rod Q, and adjusting-lever, substantially as set forth.

In testimony whereof I have signed this specification in the presence of two subscribing witnesses.

EDWARD D. CARTER.

Witnesses:
 WM. C. CREBS,
 H. Z. WINDROW.